US012686194B2

(12) United States Patent
Allison et al.

(10) Patent No.: US 12,686,194 B2
(45) Date of Patent: Jul. 21, 2026

(54) COMPOSITE MATERIAL WITH ELONGATE OPENINGS

(71) Applicant: THE NORTH FACE APPAREL CORP., Wilmington, DE (US)

(72) Inventors: Bonny Violet Allison, Wilmington, DE (US); Cory Michael Olson, Wilmington, DE (US); Jeffrey Allen Dorton, Wilmington, DE (US)

(73) Assignee: The North Face Apparel Corp., Wilmington, DE (US)

( * ) Notice: Subject to any disclaimer, the term of this patent is extended or adjusted under 35 U.S.C. 154(b) by 114 days.

(21) Appl. No.: 18/559,002

(22) PCT Filed: May 4, 2022

(86) PCT No.: PCT/US2022/027619
§ 371 (c)(1),
(2) Date: Nov. 3, 2023

(87) PCT Pub. No.: WO2022/235757
PCT Pub. Date: Nov. 10, 2022

(65) Prior Publication Data
US 2024/0227343 A1     Jul. 11, 2024

Related U.S. Application Data

(60) Provisional application No. 63/183,978, filed on May 4, 2021.

(51) Int. Cl.
B32B 7/14          (2006.01)
B32B 3/26          (2006.01)
(Continued)

(52) U.S. Cl.
CPC ................ B32B 3/266 (2013.01); B32B 5/02 (2013.01); B32B 7/14 (2013.01); B32B 27/12 (2013.01);
(Continued)

(58) Field of Classification Search
CPC ............ B32B 2250/03; B32B 2250/40; B32B 2307/724; B32B 2307/7265;
(Continued)

(56) References Cited

U.S. PATENT DOCUMENTS

| 10,814,514 | B2 | 10/2020 | Aihara |
| 2016/0339594 | A1 | 11/2016 | Aihara |
| 2020/0215786 | A1 | 7/2020 | Dorton et al. |

FOREIGN PATENT DOCUMENTS

| GB | 2553573 A | 3/2018 |
| JP | 2019-529976 A | 10/2019 |

(Continued)

OTHER PUBLICATIONS

Office Action received for Japanese Patent Application No. 2023-568037, mailed on Aug. 9, 2024, 24 pages (13 pages of English Translation and 11 pages of Original Document).
(Continued)

*Primary Examiner* — Lawrence D Ferguson
(74) *Attorney, Agent, or Firm* — Smith, Gambrell & Russell LLP

(57)          ABSTRACT
A composite material comprises a first textile layer and a slit layer coupled to the first textile layer. The slit layer comprises a plurality of elongate slits configured to transition from a first state to a second state when actuated. The first state provides a first air permeability of less than about 10 cubic feet per minute (CFM) and the second state provides a second air permeability of greater than about 10 CFM.

16 Claims, 8 Drawing Sheets

(51) Int. Cl.
B32B 5/02 (2006.01)
B32B 27/12 (2006.01)

(52) U.S. Cl.
CPC ....... *B32B 2250/03* (2013.01); *B32B 2250/40* (2013.01); *B32B 2307/724* (2013.01); *B32B 2307/7265* (2013.01); *B32B 2437/00* (2013.01)

(58) Field of Classification Search
CPC ... B32B 2437/00; B32B 27/12; B32B 27/304; B32B 27/34; B32B 27/36; B32B 27/40; B32B 3/266; B32B 5/02; B32B 5/022; B32B 5/024; B32B 5/026; B32B 7/12; B32B 7/14
See application file for complete search history.

(56) References Cited

FOREIGN PATENT DOCUMENTS

| WO | 2018/045316 A1 | 3/2018 |
| WO | 2018/046756 A1 | 3/2018 |

OTHER PUBLICATIONS

Wengan et al., "Adhesive Bonding Handbook", National Defense Industry Press, Feb. 28, 1989, pp. 538-541 (with certified translation, 7pgs).

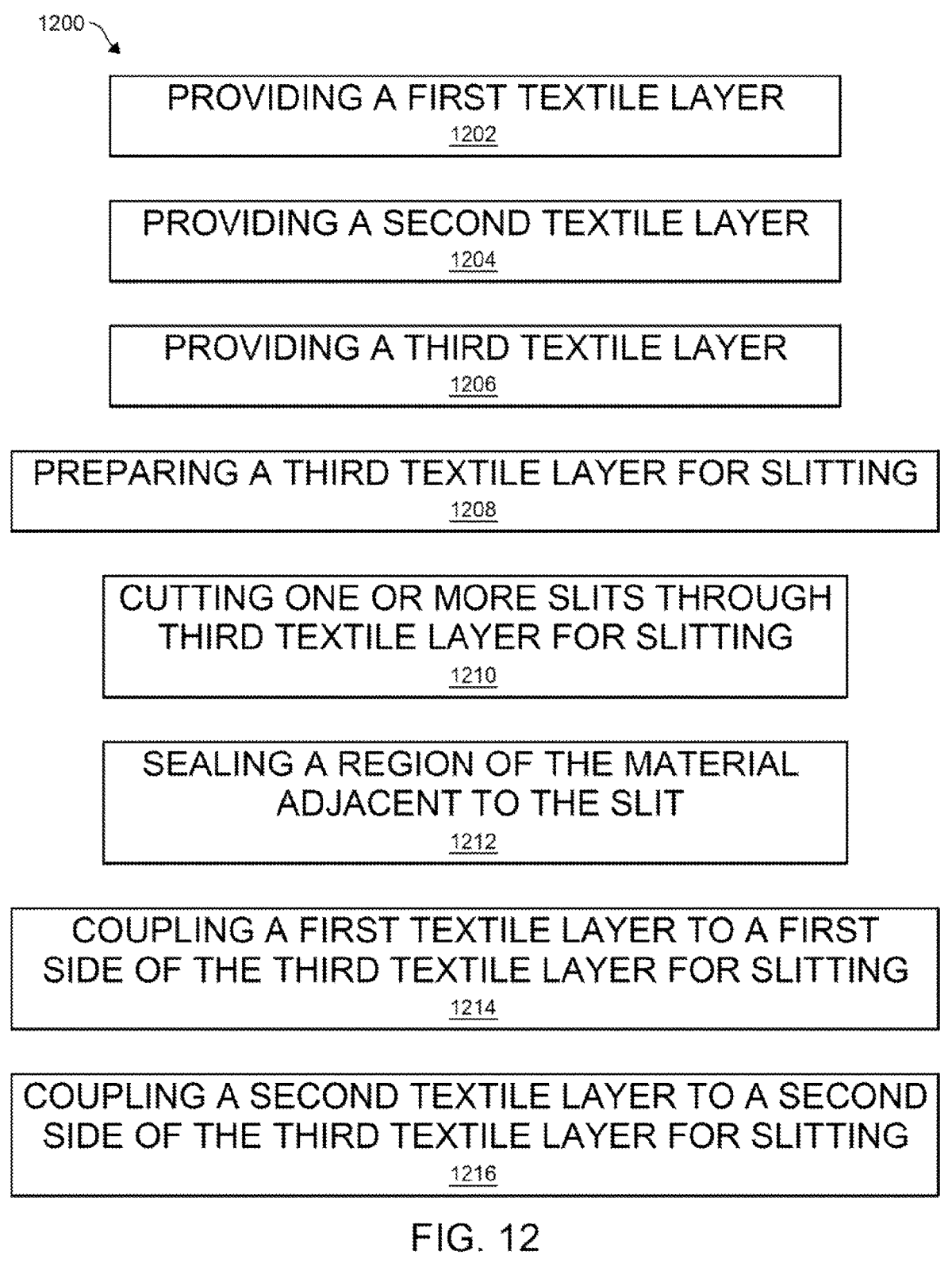

1200

PROVIDING A FIRST TEXTILE LAYER
1202

PROVIDING A SECOND TEXTILE LAYER
1204

PROVIDING A THIRD TEXTILE LAYER
1206

PREPARING A THIRD TEXTILE LAYER FOR SLITTING
1208

CUTTING ONE OR MORE SLITS THROUGH
THIRD TEXTILE LAYER FOR SLITTING
1210

SEALING A REGION OF THE MATERIAL
ADJACENT TO THE SLIT
1212

COUPLING A FIRST TEXTILE LAYER TO A FIRST
SIDE OF THE THIRD TEXTILE LAYER FOR SLITTING
1214

COUPLING A SECOND TEXTILE LAYER TO A SECOND
SIDE OF THE THIRD TEXTILE LAYER FOR SLITTING
1216

FIG. 12

COMPOSITE MATERIAL WITH ELONGATE OPENINGS

CROSS-REFERENCE TO RELATED APPLICATIONS

The present invention is filed under 35 U.S.C. § 371 as the U.S. national phase of International Application No. PCT/US2022/027619, filed on May 4, 2022, which designated the U.S. and claims the right of priority of U.S. Provisional Application No. 63/183,978, filed on May 4, 2021. The entire disclosures of the above-identified applications are hereby fully incorporated herein by reference.

BACKGROUND

People engaging in physical activities require gear that can adapt to changes in weather conditions and body position and respond to a wearer's comfort needs. Weather can be unpredictable. Also, sportspeople may experience varying body temperatures when engaging in different activities or segments of a physical activity. Accordingly, a sportsperson would benefit from gear that is flexible and can adaptively provide ventilation when needed. Current methods of ventilation, such as perforations, suffer from inefficiencies and require additional layers to adapt to changes in weather. Improvements are needed.

SUMMARY

A composite material may comprise a first textile layer; a second textile layer; and a slit layer coupled to the first textile layer and the second textile layer. The slit layer may comprise a plurality of elongate slits configured to transition from a first state to a second state when actuated, wherein the first state provides a first air permeability of less than about 10 cubic feet per minute (CFM) and the second state provides a second air permeability of greater than about 10 CFM as measured by ASTM D737.

A composite material may comprise a first textile layer and a slit layer coupled to the first textile layer, wherein the slit layer comprises a main body having a plurality of elongate slits formed therein and configured to expand about an axis from a first state to a second state in response to a stretch force applied substantially perpendicularly to the axis, wherein the first state provides a first air permeability of less than about 10 cubic feet per minute (CFM) and the second state provides a second air permeability of greater than about 10 CFM.

A composite material may comprise a face textile layer and a slit layer (e.g., material or textile layer with slits). As an example, a separate (e.g., non-bonded) fabric may be used as a hung lining.

A composite material may comprise a single layer construction configured to function similarly to the slit layer in cooperation with the first textile layer. For example, a warp knit layer may be configured to provide stretchable breathing zones that emulate the slit configuration and functionality of the slit layer, as described herein.

A method of manufacturing a composite material may comprise providing a first textile layer; providing a second textile layer and providing a slit layer. The method may further comprise preparing the slit layer for slitting; cutting one or more elongate slits through the slit layer; sealing a region of the material adjacent to the elongate slit; coupling a first textile layer to a first side of the slit layer; and coupling a second textile layer to a second side of the slit layer.

Articles of manufacture may comprise a composite material further comprising at least one textile layer with slits.

BRIEF DESCRIPTION OF THE DRAWINGS

The following drawings illustrate generally, by way of example, but not by way of limitation, various examples discussed in the present disclosure. In the drawings:

FIG. 12 shows an example method.

DETAILED DESCRIPTION

Figure 1:
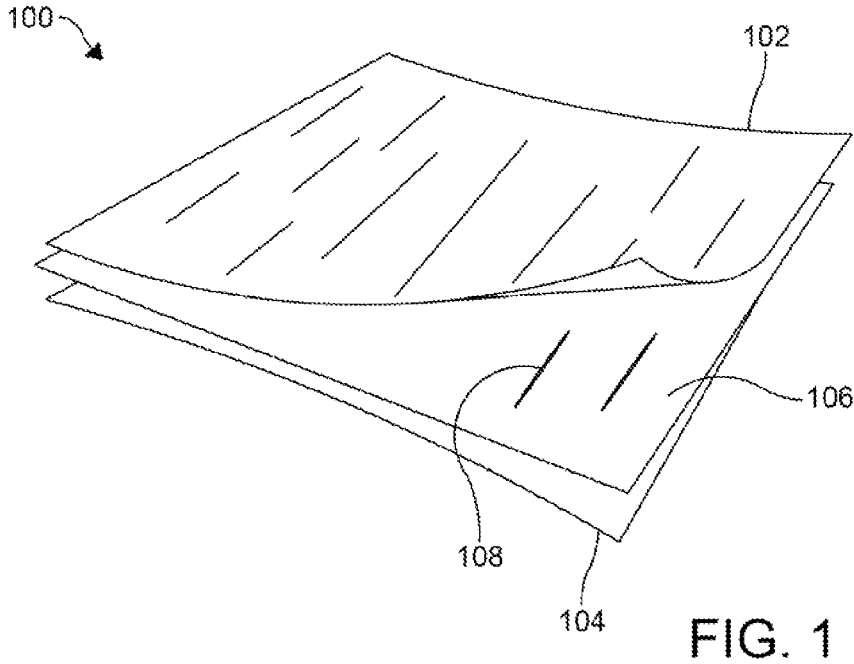
FIG. 1 shows an example composite material.

FIG. 1 shows an example composite material 100. The composite material may be adapted for a variety of climates, temperatures, or weather conditions. The composite material 100 may comprise a first textile layer 102, a second textile layer 104, and a slit layer 106. The first textile layer 102 may be a face layer (i.e., may comprise the outermost layer of an article of apparel comprising the composite material 100). The second layer may be a backer layer (i.e., may comprise the innermost layer of an article of apparel comprising the composite material 100).

The first textile layer 102 and the second textile layer 104 may comprise the same material or different material. The first textile layer 102 and/or the second textile layer 104 may comprise a woven material, such as nylon woven or polyester woven. Other materials may be used. The first textile layer 102 and/or the second textile layer 104 may comprise a stretch woven material. The first textile layer 102 and/or the second textile layer 104 may comprise a knit material.

The first textile layer 102 and/or the second textile layer 104 may comprise a non-woven or synthetic material, such as nylon, elastane, polyester, polypropylene, or a blend. The first textile layer 102 and/or the second textile layer 104 may comprise a non-synthetic material, such as cotton or wool. The first textile layer 102 and/or the second textile layer 104 may comprise a blend of fibers.

The first textile layer 102 and/or the second textile layer 104 may comprise a water-resistant material. The water-resistant material may comprise a material treated with a durable water-repellant (DWR) finish. The DWR finish may cause the material to repel water, such as by causing the water to bead up and roll of a surface of the material. Water resistance may be determined using a standardized test, such as AATCC 35. The first textile layer 102 and/or the second textile layer 104 may comprise a water resistant material having a water column test rating of around 5,000 mm/24 hours.

The first textile layer 102 and/or the second textile layer 104 may comprise a breathable material. Breathability of a material may be described by an amount of water vapor that can pass through a square meter of the material during a time frame of twenty-four hours. Breathability may be determined using a standardized test, such as BS7209 or ASTM E96. The breathable material may have a breathability of 10,000 g/m²-25,000 g/m², for example. Other breathable metrics and zones of material may be used.

The material of the first textile layer 102 and/or the second textile layer 104 may be selected based on an article to be manufactured with the composite material 100. For example, the material may be selected based on desired properties of the article, such as durability, strength, elasticity, stretch & recovery, size, cost, appearance, weight, insulation, or comfort of the article. The material may be selected based on the type of article, such an article of apparel. The material may be selected based on properties of the material, such as softness, strength, modulus of elasticity, insulation, water resistance, or wind resistance, etc.

The first textile layer 102 and/or the second textile layer 104 may be configured to form an exterior or an interior of an article. For example, if the article comprises apparel, the interior may comprise a side of the article that is in contact with a body or an interior garment of a user when the apparel is worn or a side of the article that is closer to the body of the user when the apparel is worn. The exterior may comprise a side of the article that is exposed to the environment outside the apparel or in contact with an interior layer of an additional garment when the apparel is worn. The material comprising the first textile layer 102 and/or the material comprising the second textile layer 104 may be selected based on whether the layer will form the exterior or the interior of the article. For example, a material that is water-resistant or wind-resistant may be selected for the exterior layer. As another example, a soft or breathable material may be selected for the interior layer. A material that is less water-resistant and/or less wind-resistant than the material selected for the exterior layer may be selected for the interior layer.

The slit layer 106 may comprise a material having a permeability greater or less than the permeability of the material of the first textile layer 102 and the second textile layer 104. In some embodiments, the slit layer 106 may be a water resistant membrane or laminate membrane or material. To this end, the slit layer 106 may comprise a water resistant material. The water resistant material may be less water resistant than the material of the first layer. The material may comprise a water resistant material having a water column test rating of around 5,000 mm/24 hours. The slit layer 106 may comprise a wind resistant material having a permeability of less than 10 CFM, as an example.

Figure 2:
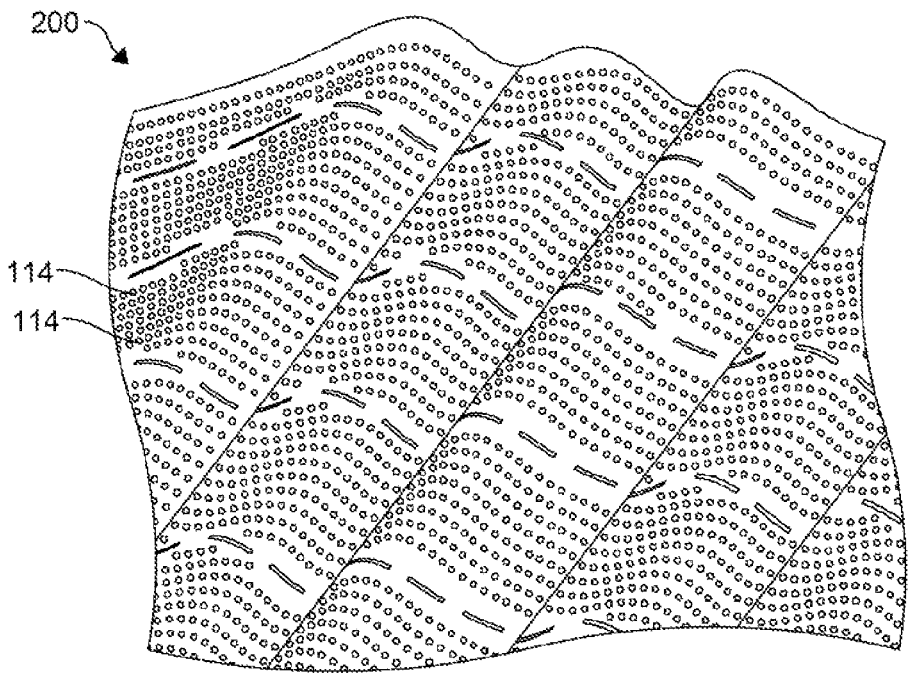
FIG. 2 shows an example slit layer of a composite material.

The slit layer 106 may be a breathable layer. The slit layer 106 may be a third layer of the composite material and may comprise a material that is more or less breathable than the material of the first textile layer 102 or the second textile layer 104. In some embodiments, the slit layer 106 may be a laminate material that is substantially air impermeable and waterproof while being permeable to water vapor. In some instances, the slit layer 106 comprises a hydrophilic water-vapor-permeable synthetic polymer. In some embodiments, the slit layer 106 may have a breathability of about 10,000 g/m²-25,000 g/m². The slit layer 106 may comprise a plurality of apertures or perforations 114. FIG. 2 shows an example slit layer of a composite material having perforations. Perforations 114 may be holes or punch-outs in the slit layer 106 and may be configured to remain open to provide a first amount of breathability. The slit layer 106 may be a stretch laminate. The stretch laminate may be configured to stretch in one or more directions, for instance, in the common directions of laminate stretching (e.g., "machine direction" and "transverse direction" stretching). In some embodiments, the slit layer 106 is a micro- or nano-porous polymeric membrane such as microporous or nano-porous polytetrafluoroethylene (PTFE), polyurethane (PU), thermoplastic polyurethane (TPU), nylon, thermoplastic elastomer (TPEE), or polyethelyne terephthalate (PET). The membrane may be hydrophilic.

The slit layer 106 may comprise a base material having one or more elongate openings or slits 108 formed therein. The elongate slits 108 may be formed within the slit layer 106 such that they penetrate through the slit layer 106. The elongate slits 108 may comprise first and second edges 110, 112. The first and second edges 11, 112 may be substantially opposite one another. The elongate slits 108 may have a longitudinal length of between 1 inch and 1 centimeter. However, other sized slits may be used. The elongate slits 108 may be spaced from each other. For example, the elongate slits may be spaced from 1 inch to 3 inches from adjacent elongate slits 108.

The elongate slits, by design operate differently than circular perforations. As an illustrative example, the elongate slits 108 may be configured to transition from a first state to a second state (i.e., a relaxed or closed state and a stretched or open state). Since the slit has an elongate configuration, when in a relaxed state, the opposing edges of the slit may come together and close or substantially restrict the opening. This is not the same as a hole or perforation that still maintains an defined opening when in a relaxed state.

FIGS. 3A-10B show various patterns of elongate slits 108 in first and second states that may be formed within the slit layer 106. As can be seen in FIGS. 3A-10B, the first state may be an inactive state or a state that does not actuate the elongate slits 108 (generally shown in FIGS. 3A, 4A, 5A, 6A, 7A, 8A, 9A, and 10A) or cause the edges of the slits to separate. The elongate slits 108 may be configured to remain substantially relaxed or closed when in the first state. The distance between opposite edges of an elongate slit may be substantially zero in a first state.

The elongate slits 108 may be configured to open when transitioning to a second state (generally shown in FIGS. 3B, 4B, 5B, 6B, 7B, 8B, 9B, and 10B). The second state may be an active state or a state that follows actuation of the elongate slits 108 that causes the edges of the slits to separate. During such a transition, an applied force may cause first and second edges of the elongate slits 108 to pull away from each other. The distance between opposite edges of an elongate slit may be more than zero in a second state.

The elongate slits 108 may formed along a first direction (or a plurality of first directions) that may be a longitudinal direction, a transverse direction and/or a diagonal direction. Throughout this description and in the claims, the term "longitudinal" refers to the direction extending from length-wise from a first end (e.g., the top) of an article comprising the composite material to a second end (e.g., the bottom), and may relate to the length or the longest dimension of the article, such as a shirt, jacket, or pants. In addition, the term "transverse" as used throughout this specification and in the claims refers to the direction or width of an article extending from one side to another side (e.g., left and right sides). The transverse direction can generally be orthogonal to the longitudinal direction. Further, the term "diagonal" as used throughout this specification and in the claims refers to a sloping or incline direction relative to the longitudinal and transvers (or lateral) directions referred to above. As used herein, any slit or line following a direction that is greater than 0 degrees and less than 90 degrees relative to the longitudinal and transverse directions may be referred to as diagonal.

Figures 3A, 3B, 4A, 4B, 5A, 5B:
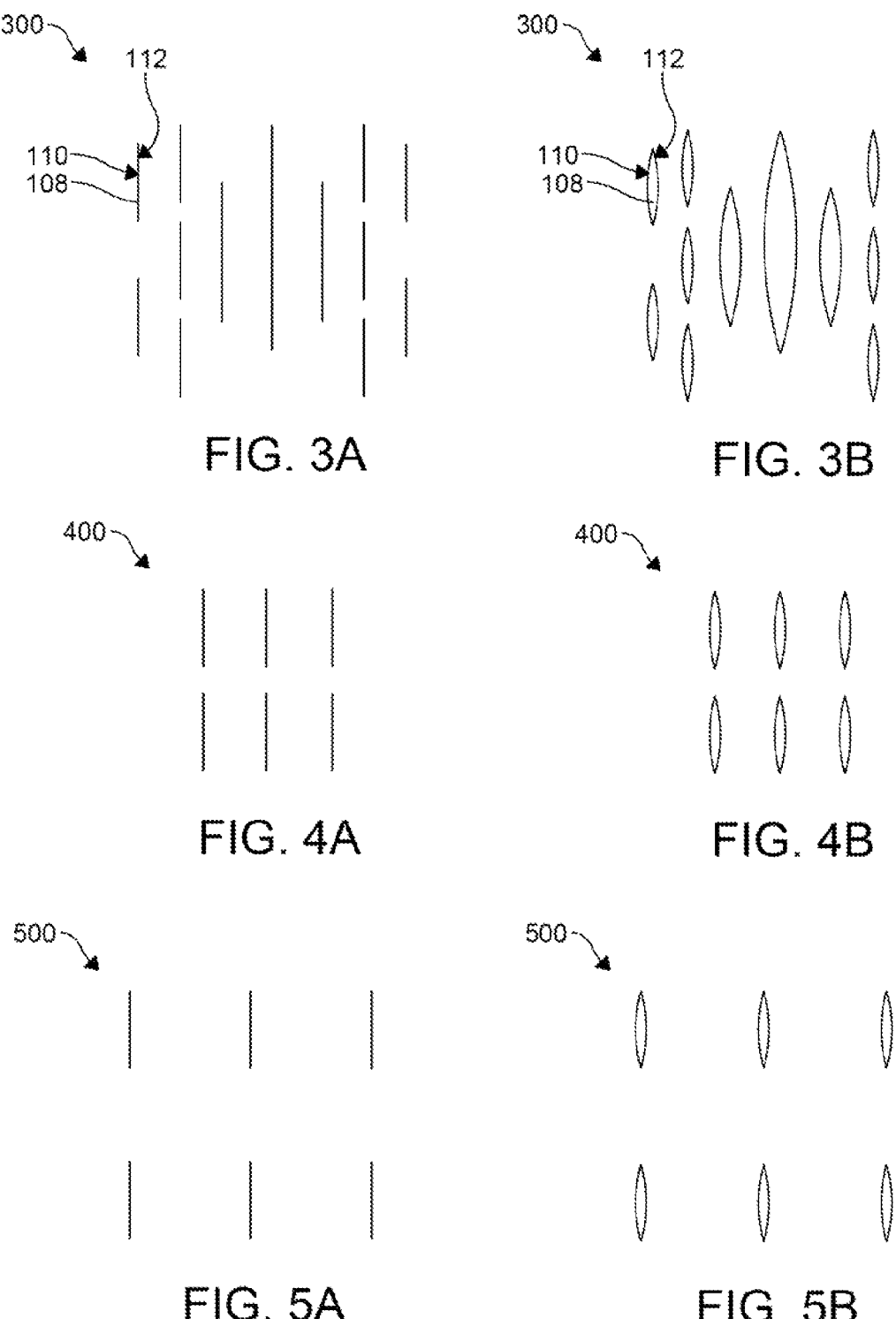
FIGS. 3A-3B show an elongate slit pattern in first and second states aligned longitudinally, where the elongate slits vary in length.
FIGS. 4A-4B show an elongate slit pattern in first and second states aligned longitudinally.
FIGS. 5A-5B show an elongate slit pattern in first and second states aligned longitudinally in an alternative arrangement.
Figures 6A, 6B, 7A, 7B, 8A, 8B:
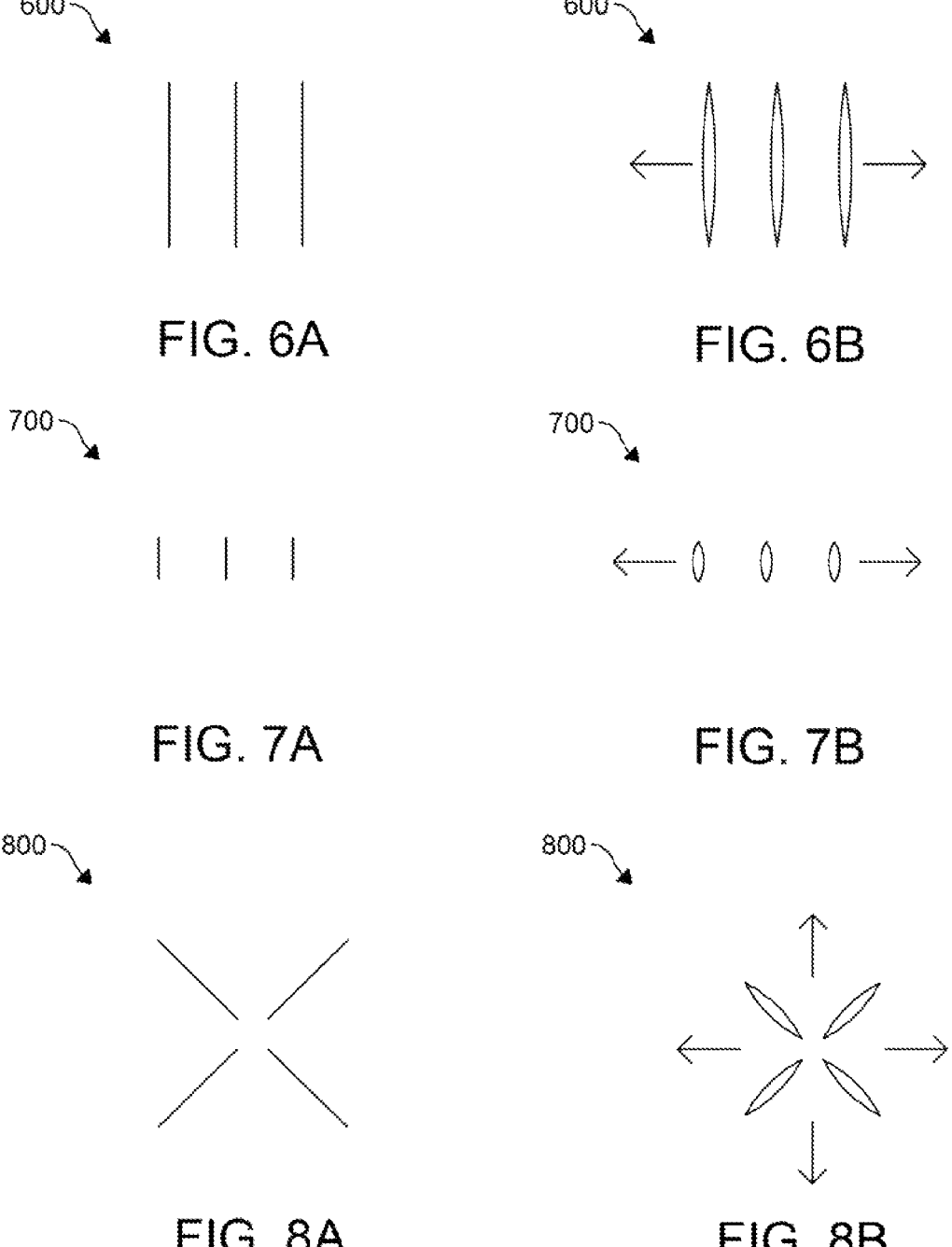
FIGS. 6A-6B show an elongate slit pattern in first and second states aligned longitudinally in a further alternative arrangement.
FIGS. 7A-7B show an elongate slit pattern in first and second states aligned longitudinally in a further alternative arrangement.
FIGS. 8A-8B show an elongate slit pattern in first and second states aligned diagonally.
Figures 9A, 9B, 10A, 10B:
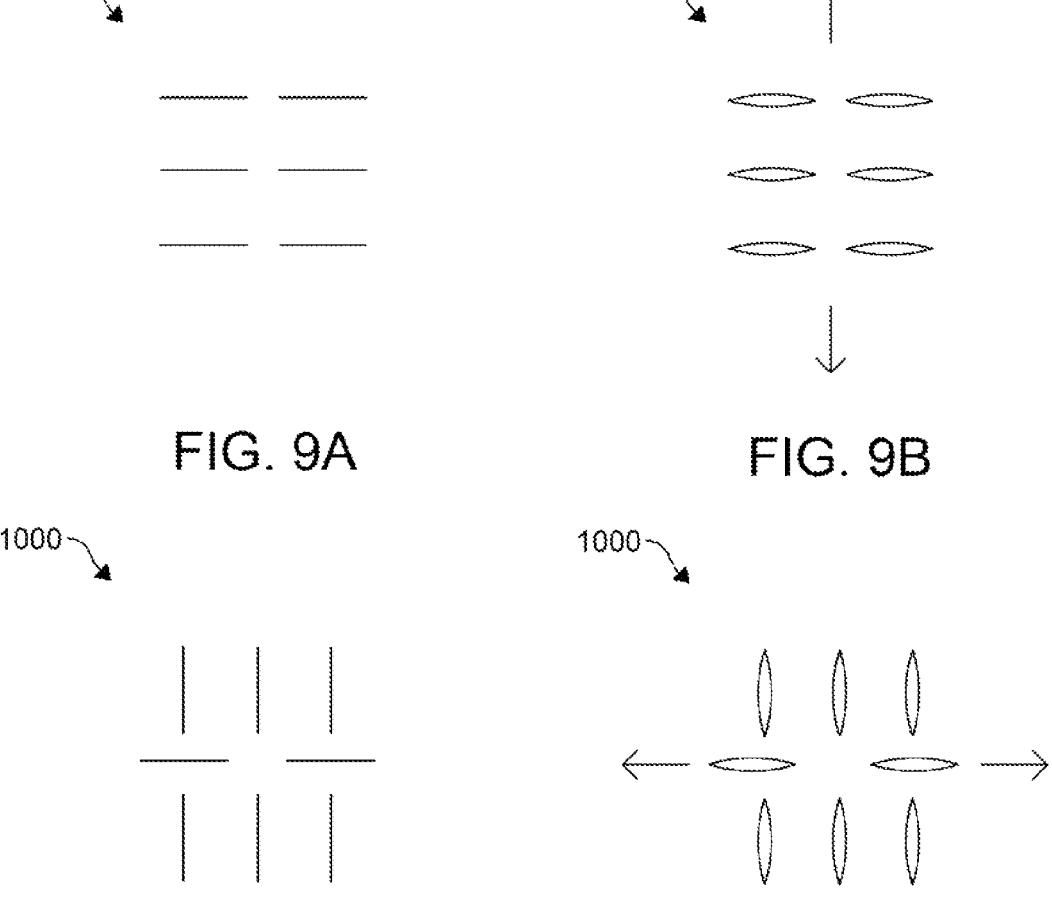
FIGS. 9A-9B show an elongate slit pattern in first and second states aligned transversely.
FIGS. 10A-10B show an elongate slit pattern in first and second states aligned both longitudinally and transversely.

FIGS. 3A-3B show an elongate slit pattern 300 in first and second states aligned longitudinally, where the elongate slits 108 vary in length. FIGS. 4A-4B show an elongate slit pattern 400 in first and second states aligned longitudinally at a first spacing, where the elongate slits 108 are a first length. FIGS. 5A-5B show an elongate slit pattern 500 in first and second states aligned longitudinally at a second spacing, greater than the first spacing. A greater spacing may increase wind protection in a first state and decrease air permeability in a second state. FIGS. 6A-6B show an elongate slit pattern 600 in first and second states aligned longitudinally at a second spacing, less than the first spacing, where the elongate slits 108 are also longer than the elongate slits 108 shown in FIGS. 4A-5B. A shorter spacing and longer elongate slits 108 may decrease wind protection in a first state and increase air permeability in a second state. FIGS. 7A-7B show an elongate slit pattern 700 in first and second states aligned longitudinally where the elongate slits 108 have a second length less than the first length. A shorter elongate slit length may increase wind protection in a first state and decrease air permeability in a second state. FIGS. 8A-8B show an elongate slit pattern 800 in first and second states aligned diagonally. FIGS. 9A-9B show an elongate slit pattern 900 in first and second states aligned transversely. FIGS. 10A-10B show an elongate slit pattern 1000 in first and second states aligned both longitudinally and trans-versely. Elongate slits 108 may be of any suitable length and may be aligned in one or more directions on the slit layer 106 at any spacing, including uniform or non-uniform lengths or spacings.

The elongate slits 108 may actuate in a second direction perpendicular to the first direction in response to an applied force (e.g., a stretch force) in the second direction. For instance, one or more elongate slits 108 may be aligned longitudinally (i.e., along longitudinal axis L) as shown in FIGS. 3A-7B. FIGS. 3A-7B illustrate the actuation of the slit layer 106 relative to the longitudinal direction in a relaxed or unstretched state. As shown in FIG. 3A, the elongate slits 108 are substantially closed. As shown in FIG. 3B, under a stretching load in the transverse direction, the elongate slits 108 open in the transverse direction due to stretching force received by the composite material, including the first and second textile layer layers 102, 104.

In embodiments, one or more elongate slits 108 may be aligned diagonally, (i.e., along one or more diagonal axes $D_1$ and $D_2$) as shown in FIGS. 8A-8B. FIGS. 8A-8B illustrate the actuation of the slit layer 106 relative to the diagonal direction in a relaxed unstretched state. As shown in FIG. 8A, the elongate slits 108 are substantially closed. As shown in FIG. 8B, under a stretching load in opposing the diagonal direction (e.g., one or more directions along axes $D_1$ or $D_2$), the elongate slits 108 may open in perpendicular diagonal directions relative to the diagonal directions of the force due to stretching force received by the composite material, including the first and second textile layer layers 102, 104. In an arrangement where one or more elongate slits 108 are arranged along a bias of the slit layer 106 (e.g., along a 45 degree angle with respect to the longitudinal and transverse axes), and the slit layer 106 is composed of a woven material having warp and weft directions, actuation of the elongate slit may be increased due to the stretch properties imparted onto the material due to the bias cut.

In other embodiments, one or more elongate slits 108 may be aligned transversely (i.e., along transverse axis T) as shown in FIGS. 9A-9B. FIGS. 9A-9B illustrate the actuation of the slit layer 106 relative to the transverse direction in a relaxed or unstretched state. As shown in FIG. 9A, elongate slits 108 are substantially closed. As shown in FIG. 9B, under a stretching load in the longitudinal direction, the elongate slits 108 open in the longitudinal direction due to stretching force received by the composite material, includ-ing the first and second textile layer layers 102, 104.

The elongate slits 108 may be arranged in a pattern. The pattern may be configured to control air permeability. For example, the pattern may be configured to minimize or maximize opening upon movement of a wearer of an article comprising the composite material 100. The pattern may be selected based on, for instance, the type of activity and/or garment. For example, the pattern, including the length, spacing and amount of elongate slits, may be selected based on a weight or thickness of the slit layer 106. The pattern may be selected based on a type of article to be manufac-tured using the composite material 100. The pattern may comprise a uniform or non-uniform distance between each of the plurality of slits. For example, FIGS. 4A-7B show elongate slits 108 that are evenly spaced. However, other distances or spacing is possible. The pattern may comprise rows and/or columns of elongate slits of equal length or varying lengths. Various slit patterns may be designed for various articles configured for specific wearing conditions and/or activities, including combinations of longitudinal and transverse elongate slits 108 as shown in FIGS. 10A-10B, or combinations of any of longitudinal, transverse or diagonal elongate slits 108.

The composite material 100 may be configured to selec-tively prevent or permit passage of air through the layers. For example, in a first state, the composite material 100 may be configured to prevent or restrict the flow of air through the composite material to a body of a user of an article of apparel comprising the composite material 100. Specifically, in the first state, the slit layer 106 may be configured to prevent, restrict or limit the passage of air through the slit layer 106. To this end, the slit layer 106 may comprise a wind-resistant or windproof material. Wind resistance of a material may be described by an amount of cubic feet per minute (CFM) of about a 30-mile-per-hour wind that can pass through one square foot of the material. Wind resistance may be determined using a standardized test such as ASTM D737. The first textile layer 102 and/or the second textile layer 104 may comprise a windproof material having a permeability of 0-2 or 3-4 CFM. The first textile layer 102 and/or the second textile layer 104 may comprise a wind-resistant material having a permeability of 5-20 CFM.

Generally, the slit layer 106 may be formed to provide a first level of air permeability regardless of the number, length or positioning of the elongate slits 108. For instance, independent of configurations having elongate slits 108 formed along different axes, at different spacings and/or having different lengths, the first state may generally be configured to provide an air permeability of less than about 10 CFM, and a second state may generally be configured to provide an air permeability of more than about 10 CFM, as measured by ASTM D737. In some embodiments, a second state may generally be configured to provide an air permeability of more than about 20 CFM. In some embodiments, a second state may generally be configured to provide an air permeability of more than about 30 CFM.

Configurations having elongate slits 108 of roughly the same size may generally provide the same levels of air permeability in each of the first second states, regardless of whether they are along the longitudinal, transverse or diagonal axes or some combination thereof. For instance, where elongate slits 108 are generally uniform and are between 1 inch and 1 centimeter in longitudinal length, a relaxed state may provide an air permeability of less than about 10 CFM, and a stretched state, the air permeability may be greater than about 10 CFM.

The elongate slits 108 may be located in one or more discrete regions of the composite material 100. The shape and/or positioning of the slits may be selected based on a desired property of the material or of an article comprising the material. Example properties include permeability, weight, waterproofing, insulation, or aesthetics. The property may comprise a pattern of slits or cuts in the material or article. The pattern may be selected based on a type of article to be manufactured using the material, such as outerwear, gloves, footwear, underwear, headwear, athletic wear, sporting equipment, outdoor equipment, or automotive accessories.

Placement of the slits may be configured to impart more or less air permeability to the composite material (i.e., to provide more or less air permeability in various zones or regions of the composite material). The slit geometry may provide an amount of control over the air permeability in first and second states, as well as the delta (i.e. the change) between relaxed and stretched states. As can be seen in FIGS. 7A-7B, slit layer 106 may comprise relatively short elongate slits 108. A shorter length elongate slit may provide decreased air permeability when opened and increased wind protection when closed.

As discussed herein, the material properties of the slit layer 106 (e.g., membrane or laminate) may provide a first level of control over how great the transition between states may be. One or both of first textile layer 102 and second textile layer 104 may provide an additional level or levels of controlling the opening and/or closing of the elongate slits 108. To this end, one or both of first textile layer 102 and second textile layer 104 may be comprised of fibers or material that provides an amount of stretch and recovery in at least one direction.

The first and second textile layers 102, 104 (e.g., the face and backer materials) may be laminated, glued, or otherwise coupled to the slit layer 106 (e.g., membrane comprising elongate slits) such that the stretch properties of the face/back can help control the deformation of the slits, as well. For instance, one or both of first textile layer 102 and second textile layer 104 may be comprised of material having two-way stretch properties or four-way stretch properties. The first and second textile layers 102, 104 may be adhered together and to the slit layer 106 via a dot pattern or dot matrix adhesive applied in such a manner that preserves the intended two or four-way stretch as contemplated. In this manner, the amount of actuation of one or more elongate slits 108 may be further tunable by the stretch/recovery properties of one or more of the first textile layer 102 and second textile layer 104. For instance, the stretch/recovery properties of one or more of the first textile layer 102 and second textile layer 104 may limit the actuation of one or more of the elongate slits 108. Alternatively, the stretch/recovery properties of one or more of the first textile layer 102 and second textile layer 104 may encourage or accelerate the actuation of one or more of the elongate slits 108. In an embodiment, the first textile layer 102 and the second textile layer 104 may comprise a two-way stretch material or a four-way stretch material adhered to a slit layer 106 having slit combinations and/or an adhesive pattern (e.g., glue dot adhesive) which may enhance or limit the openings.

Tunability of the air permeability may be further informed by the manner in which the first, second and third textiles layers are coupled to form the composite material. The first and second textile layers 102, 104 (e.g., the face and backer materials) may be laminated, glued, or otherwise coupled to the slit layer 106 such that the stretch properties of the face/back can help control the actuation and deformation of the elongate slits 108. Coupling the first, second and third layers may comprise sewing, laminating, adhering, weaving, welding, etc., or otherwise joining all or portions of the layers together in a stacked configuration. In some embodiments, the first, second and slit layers 106 may be formed in sheets, where the first textile layer 102, the second textile layer 104 and the slit layer 106 may each comprise a sheet. The sheets may have perimeters. At least a portion of the perimeter of the first textile layer 102 sheet may be joined to at least a portion of the perimeter of a first side of the slit layer 106. At least a portion of the perimeter of the second textile layer 104 sheet may be joined to at least a portion of the perimeter of a second side of the slit layer 106, thereby joining the first, second, and third layers together.

Figures 13, 14:
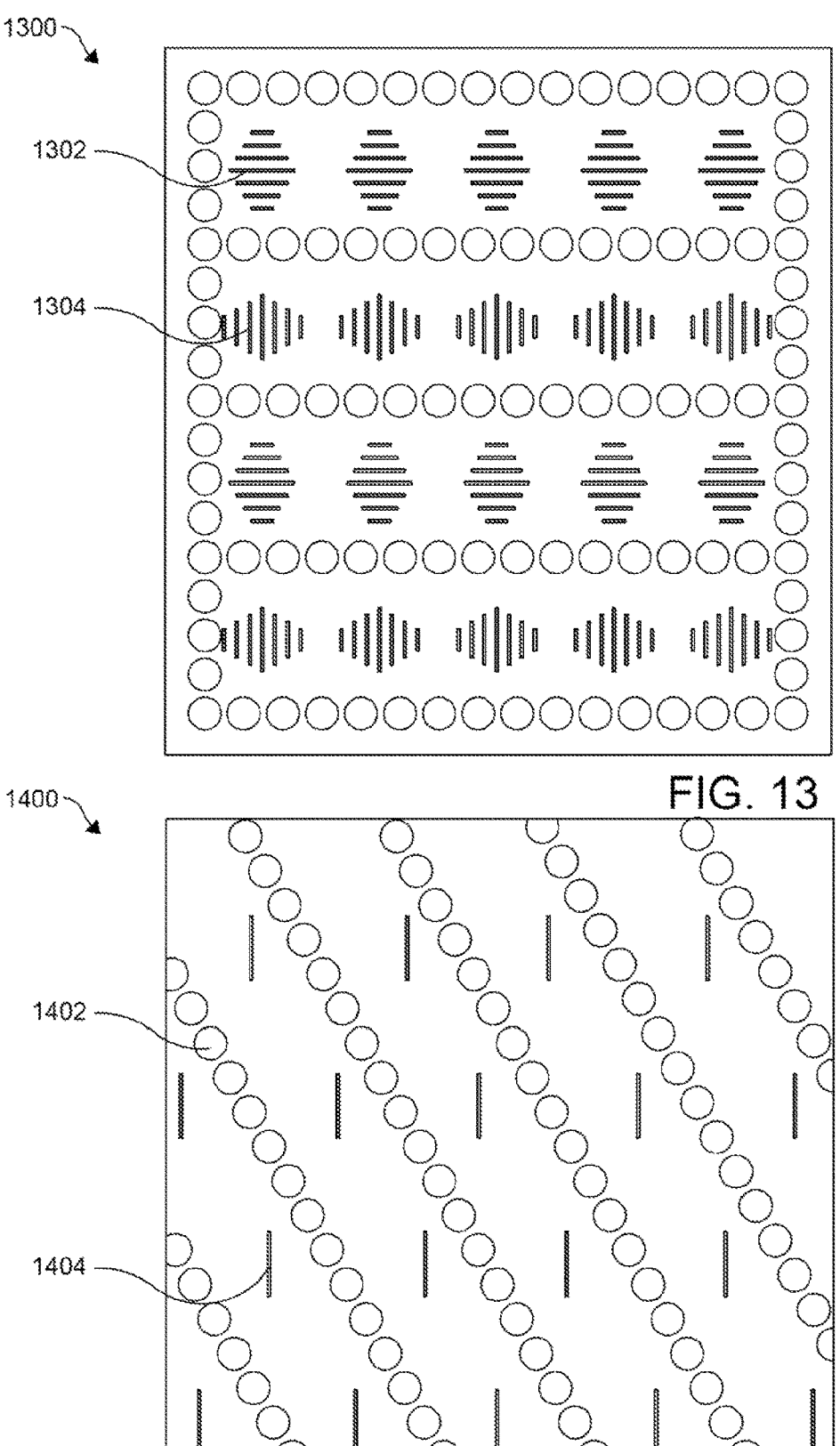
FIG. 13 shows an example composite material having an elongate slit pattern according to embodiments of the disclosure.
FIG. 14 shows an example composite material having an elongate slit pattern according to embodiments of the disclosure.
Figure 15:
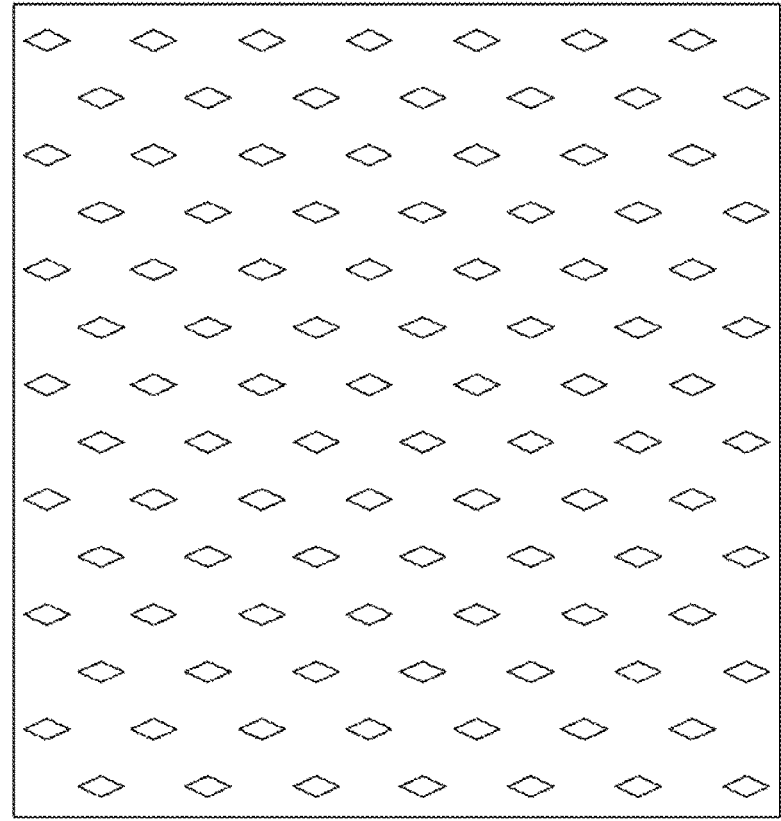
FIG. 15 shows an example composite material having an elongate slit pattern according to embodiments of the disclosure.
Figure 16:
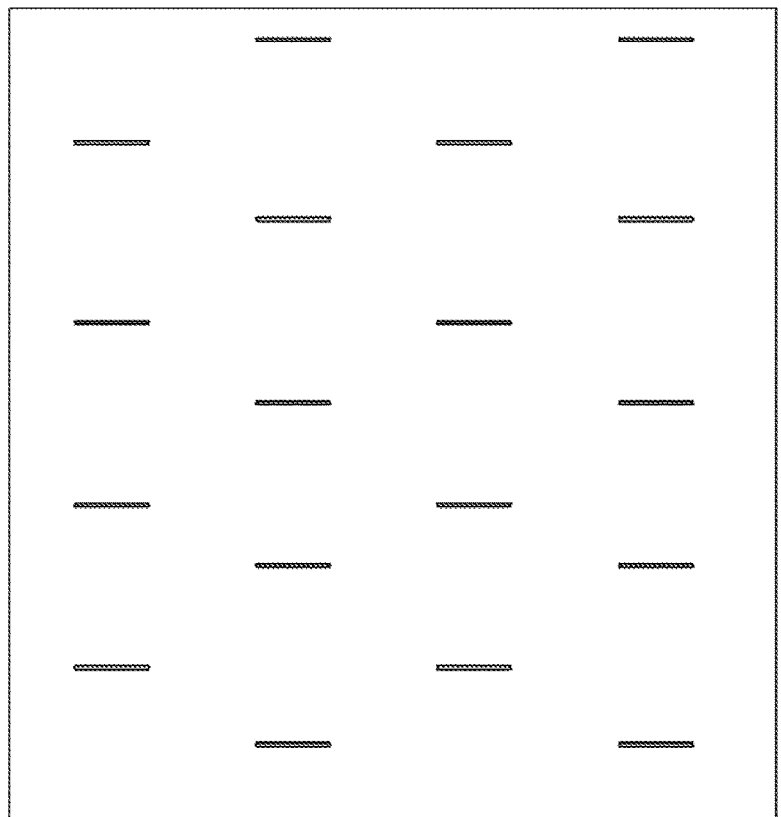
FIG. 16 shows an example composite material having an elongate slit pattern according to embodiments of the disclosure.

FIGS. 13-16 show further examples of composite materials according to embodiments described herein. As shown in FIG. 13, the elongate openings formed in the slit layer (e.g., slit layer 106) may be formed in a pattern of alternating rows. A first row 1302 may comprise elongate slits formed in groups, where the elongate slits are formed transversely (or laterally) within the textile layer and the groups of transverse elongate slits are arranged transversely across the textile layer. A slit layer may comprise similar elongate slits formed in groups, and arranged in a second row 1304, where the elongate slits are formed longitudinally, and the groups of longitudinal elongate slits are also arranged transversely across the textile layer. Adhesive (e.g., dot glue or dot matrix adhesive) may be used to join the first or second textile layer and the slit layer. FIGS. 14-16 show additional embodiments as described herein, where elongate slits are formed in a slit layer and the slit layer is at least partially adhered to a textile layer. In some embodiments, only the periphery of the slit layer is joined to the textile layer(s). FIG. 14 shows an example slit layer having diagonal rows of adhesive 1402 cutting across rows of longitudinal elongate openings 1404. FIG. 15 shows an example slit layer having rows of offset elongate openings in an open state. FIG. 16 shows an example slit layer having rows of offset elongate openings in a closed state.

Figure 11:
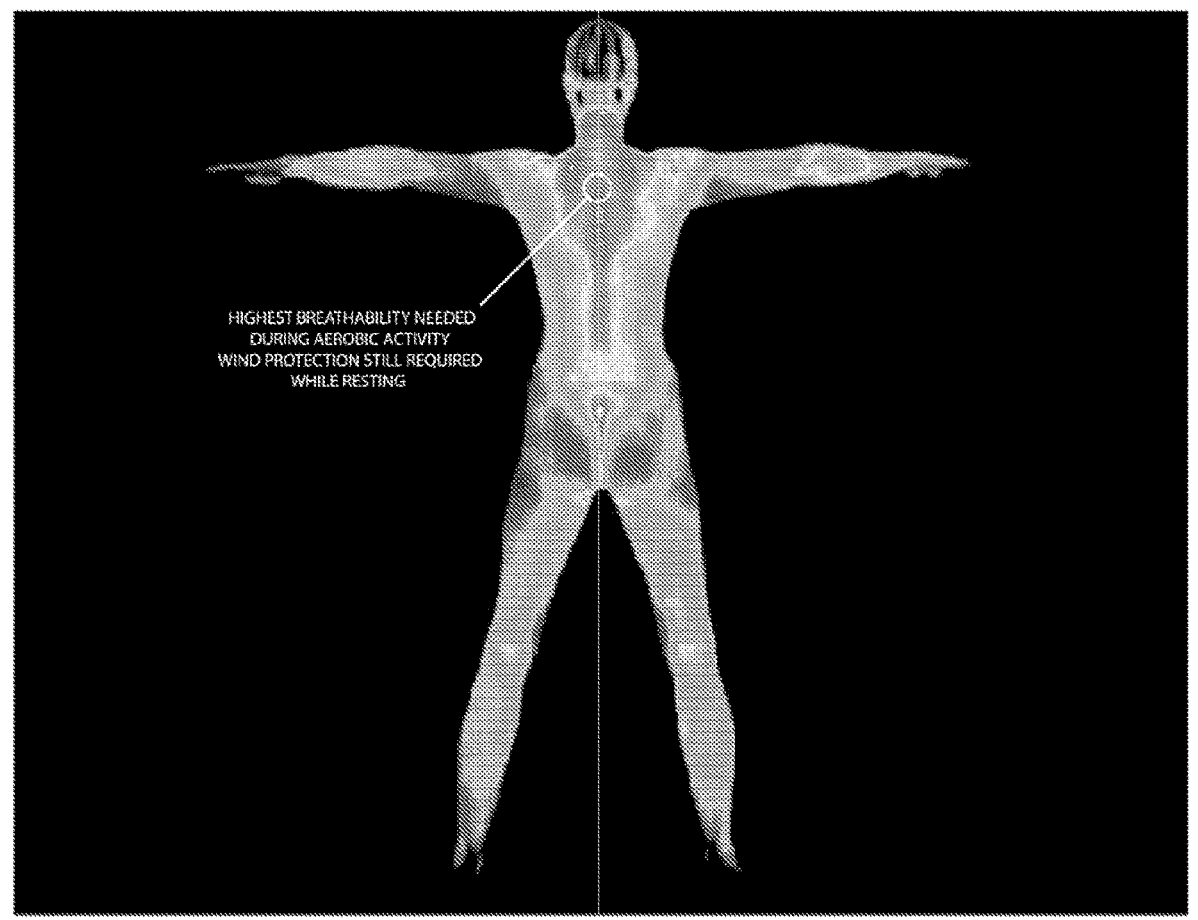
FIG. 11 shows an example heat map illustrating body portions where heat may be concentrated during an activity.

The elongate slits 108 may be arranged in one or more patterns such that, when formed into an article, the elongate slits 108 are positioned in one or more zones of the article that would benefit from the additional air permeability provided by the elongate slits 108 in the stretched state. FIG. 11 shows an example heat map illustrating body portions where heat may be concentrated during an activity. FIG. 11 shows a plurality of zones of a body where increased air permeability may provide increased wearer comfort. Where the article comprises an article of apparel, the article of apparel may comprise at least one of a jacket, a sweater, a shirt, a dress, or a vest, and the one or more zones may comprise one or more of a back portion or sub-region of a back portion (e.g., upper back portion, central back portion, low back portion, etc.), an underarm portion of a sleeve, a wrist portion of a sleeve, a forearm portion of a sleeve, an elbow portion of a sleeve, a bicep portion of a sleeve, a shoulder portion of a sleeve, a hood, a pocket portion, or an abdominal portion of the at least one of the jacket, the sweater, the shirt, the dress, or the vest. Where the article comprises an article of apparel, the article of apparel may comprise at least one of a pants or shorts; and the one or more zones may comprise one or more of an ankle portion, a calf portion, a knee portion, a thigh portion, a crotch portion, a waist portion, or a pocket portion of the at least one of the pants or the shorts.

In some instances, the elongate slits 108 may be formed using a cutting implement such as a stamp, a roller, or a laser. The cutting implement may have a prescribed pattern and the pattern may be adapted by changing the underlying material. The cutting implement used to form the elongate slits 108 may comprise a cutting component. The cutting component may be configured to cut the material. Cutting component may be a blade, a laser, or other implement suitable for forming the elongate slits 108. The cutting component may be configured to cut material that is put in contact with the cutting component. The cutting component may be configured to cut material that is aligned with the cutting component. The cutting component may be configured to cut a slit in the material. If the material comprises a plurality of plies, such as folded layers or stacked or superposed plies of different materials, the cutting component may be configured to cut a slit through each of the layers or plies.

The cutting implement may be arranged on the surface of the slit layer 106 in a pattern. The pattern may be selected based on a desired physical property of the material or of an article comprising the material. Example properties include permeability, weight, waterproofing, insulation, or aesthetics. The property may comprise a pattern of slits or cuts in the material or article. The pattern may be selected based on the type of article to be manufactured using the material, such as outerwear, gloves, footwear, underwear, headwear, athletic wear, sporting equipment, outdoor equipment, or automotive accessories.

In some instances, the cutting component may be configured to sonically or ultrasonically cut the material. In such instances, vibratory energy may be transmitted to a cutting component, such as a blade. Specifically, the cutting component may use sonic or ultrasonic cutting technology and may further comprise using a blade, configured to vibrate at a frequency greater than or equal to 20 kHz. The blade may be vibrated by applying electric energy to a transducer or to a piezoelectric element configured to displace the transducer. An oscillator may be configured to drive the transducer. The blade may be vibrated at a selected amplitude, such as between 10-70 μm. The frequency and amplitude may be selected or controlled based on the material. For example, the frequency and amplitude may be selected based on a thickness of the material or type of the material.

Edges of the elongate slits 108 may be sealed after cutting. In some instances, edges may be fused, welded or sonically welded. Sealing the edges may comprise bonding one or more plies of the material together. Sealing the edges of the elongate slits 108 may prevent fraying or tearing. Sealing the edges may comprise fusing fibers along the edges of the elongate slits 108. Sonic welding may comprise using vibratory energy to cause localized heating or predetermined energy density in a region of the material (e.g., the edges of the elongate slits 108 formed in the slit layer 106).

FIG. 12 shows an example method 1200. At step 1202, a first textile layer may be provided. The first textile layer may be, for instance, first textile layer 102 as described herein.

At step 1204, a second textile layer may be provided. The second textile layer may be, for instance, first textile layer 104 as described herein.

At step 1206, a slit layer may be provided. The slit layer may be, for instance, slit layer 106 as described herein.

At step 1208, the slit layer may be prepared for slitting. The textile layer may comprise a fabric, a knit material, a woven material, a synthetic material, a blend material or any other material described herein as examples. Preparing the material may comprise stretching the material. Preparing the material may comprise laying the material on a surface. The surface may comprise a surface with a hardness that is resistant to cutting, such as with the cutting component of the cutting implement. The surface may have a heat resistance such that heat from the laser or the welding component of the sonic roller will not melt the surface. Preparing the material may comprise securing one or more ends of the material. In further embodiments, preparing the textile layer may comprise folding a piece of the textile layer or stacking a plurality of plies of the material or plies of different materials (such as the aforementioned materials).

At step 1210, one or more slits may be cut through the slit layer. The slits may be cut by a cutting component. The slits may be cut mechanically, sonically, or using laser light. The slits may be cut through one or more layers or plies of the material. The slits may be cut by putting the cutting component in contact with the material or with a top layer or ply of a stack of materials or folded materials. The slits may be cut in a shape corresponding to a shape of the cutting component or to a blade of the cutting component. For example, the slits may have the same dimensions as the cutting component. The slits may be cut through more than one layers or plies of a stack of materials or folded materials, such as a subset of the layers or plies or all of the layers or plies.

At step 1212, a region of the material adjacent to the slit may be sealed. The region may be sealed by fusing, melting or welding the region. The region may surround the slit. Sealing the material adjacent to the slit (e.g., the edges of the slit) may minimize or prevent wear or fraying adjacent to the sealed region or tearing through the sealed region.

At step 1214, a first textile layer may be coupled to a first side of the slit layer. At step 1212, a second textile layer may be coupled to a second side of the slit layer.

In alternative embodiments, the first, second and slit layers may be joined simultaneously via sewing, welding, gluing, or otherwise joining the edges or perimeters of the first, second and slit layers.

The composite material 100 may be used to manufacture articles. The composite material articles may include articles of apparel, such as shirts, jackets, pants, hats, gloves, jumpsuits, or other outerwear, blankets or sporting or outdoor equipment such as tents. An article of apparel comprising the composite material 100 may be configured such that the second textile layer is closer to a body of a user of the article than the first textile layer when the article is in normal use. The composite material 100 may prevent wind or air from entering the article and passing through the article to the body of the user when in a first state. When actuated, air may pass through the composite material 100 as described herein. The first, second, and slit layers may each comprise a material selected based on an article to be manufactured using the composite material 100. For example, materials with physical properties may be suitable for articles for certain activities. The materials may be selected based on desired physical properties of the composite material 100, such as weight, reflectiveness, thickness, color, strength, or flexibility.

The present disclosure comprises at least the following aspects:

Aspect 1. A composite material comprising: a first textile layer; a second textile layer; and a slit layer coupled to the first textile layer and the second textile layer, wherein the slit layer comprises a plurality of elongate slits configured to transition from a first state to a second state when actuated, wherein the first state provides a first air permeability of less than about 10 cubic feet per minute (CFM) and the second state provides a second air permeability of greater than about 10 CFM.

Aspect 2. A composite material comprising: a first textile layer; a second textile layer; and a slit layer coupled to the first textile layer and the second textile layer, wherein the slit layer comprises a plurality of elongate slits configured to expand about an axis from a first state to a second state in response to a stretch force applied substantially perpendicularly to the axis, wherein the first state provides a first air permeability of less than about 10 cubic feet per minute (CFM) and the second state provides a second air permeability of greater than about 10 CFM.

Aspect 3. The composite material of any one of aspects 1 or 2, wherein the second state provides a second air permeability of greater than about 20 CFM.

Aspect 4. The composite material of any one of aspects 1-3, wherein the second state provides a second air permeability of greater than about 30 CFM.

Aspect 5. The composite material of any one of aspects 1-4, wherein each of the plurality of elongate slits is arranged in a longitudinal direction.

Aspect 6. The composite material of aspect 5, wherein the plurality of elongate slits are configured to open in the longitudinal direction due to a stretching force received by the composite material in a transverse direction.

Aspect 7. The composite material of any one of aspects 1-6, wherein each of the plurality of elongate slits is arranged in a transverse direction.

Aspect 8. The composite material of aspect 7, wherein the plurality of elongate slits is configured to open in the transverse direction due to a stretching force received by the composite material in a longitudinal direction.

Aspect 9. The composite material of any one of aspects 1-8, wherein each of the plurality of elongate slits is arranged in a first diagonal direction.

Aspect 10. The composite material of aspect 9, wherein the plurality of elongate slits are configured to open in a second diagonal direction substantially perpendicular to the first diagonal direction due to a stretching force received by the composite material in the second diagonal direction.

Aspect 11. The composite material of any one of aspects 1-10, wherein the plurality of elongate slits are arranged in two or more of a longitudinal direction, a transverse direction or a diagonal direction and are configured to open in an opposite direction to each direction in which the plurality of elongate slits are arranged in response to a stretch force applied in the opposite direction.

Aspect 12. The composite material of any one of aspects 1-11, wherein the first material and the second material have a different at least one of water resistance, wind resistance, or air permeability.

Aspect 13. The composite material of any one of aspects 1-12, wherein the first textile layer comprises a first material and the second textile layer comprises a second material different than the first material.

Aspect 14. The composite material of any one of aspects 1-13, wherein at least one of the first textile layer or the second textile layer is configured to increase the expansion of the plurality of elongate slits in response to the stretch force.

Aspect 15. The composite material of any one of aspects 1-14, wherein at least one of the first textile layer or the second textile layer is configured to restrict the expansion of the plurality of elongate slits in response to the stretch force.

Aspect 16. The composite material of any one of aspects 1-15, wherein the slit layer is a laminate or membrane.

Aspect 17. The composite material of aspect 16, wherein the slit layer is a waterproof breathable laminate or membrane.

Aspect 18. The composite material of aspect 17, wherein the slit layer comprises perforations.

Aspect 19. A method of making the composite material of any one of aspects 1-18.

Aspect 20. An article of manufacture comprising the composite material of any of aspects 1-19.

Aspect 21. The article of manufacture of aspect 10, wherein the article of apparel comprises an interior and an exterior and a middle layer comprising the composite material of any one of aspects 1-18.

Aspect 22. The article of manufacture of any one of aspects 20-21, wherein the article of apparel comprises at least one of a jacket, a sweater, a shirt, a dress, or a vest; and wherein the plurality of sections comprise one or more of a wrist portion of a sleeve, a forearm portion of a sleeve, an elbow portion of a sleeve, a bicep portion of a sleeve, a shoulder portion of a sleeve, a hood, a pocket portion, or an abdominal portion of the at least one of the jacket, the sweater, the shirt, the dress, or the vest.

Aspect 23. The article of manufacture of any one of aspects 20-22, wherein the article of apparel comprises at least one of pants or shorts; and wherein the plurality of sections comprise one or more of an ankle portion, a calf portion, a knee portion, a thigh portion, a crotch portion, a waist portion, or a pocket portion of the at least one of the pants or the shorts.

Aspect 24. A method of making the article of manufacture of any one of aspects 20-23.

What is claimed:

1. A composite material comprising:

a first textile layer;

a second textile layer; and a slit layer coupled to the first textile layer and the second textile layer, wherein the slit layer comprises a main body having a plurality of elongate slits formed therein, the plurality of elongate slits being arranged such that, when the composite material is stretched in a direction transverse to a longitudinal direction of the plurality of elongate slits, the plurality of elongate slits open, thereby transitioning the composite material from a first state to a second state;

wherein in the first state, the composite material is in a relaxed condition in which the plurality of elongate slits are closed, and the composite material has a first air permeability of less than about 10 cubic feet per minute (CFM);

wherein in the second state, the composite material is in a stretched condition in which the plurality of elongate slits are at least partially open, and the composite material has a second air permeability of greater than about 10 CFM;

wherein the main body comprises a first plurality of dots of adhesive arranged in a first line;

wherein the main body comprises a second plurality of dots of adhesive arranged in a second line;

wherein the first line is parallel to the second line; and wherein at least a subset of the elongate slits are disposed between the first line and the second line on the main body.

2. The composite material of claim 1, wherein the second state provides a second air permeability of greater than about 20 CFM.

3. The composite material of claim 1 wherein the second state provides a second air permeability of greater than about 30 CFM.

4. The composite material of claim 1, wherein the elongate slits are arranged in a longitudinal direction.

5. The composite material of claim 4, wherein each of the elongate slits is configured to open in the longitudinal direction due to a stretching force received by the composite material in a transverse direction.

6. The composite material of claim 1, wherein the elongate slits are arranged in a transverse direction.

7. The composite material of claim 6, wherein the elongate slits are configured to open in the transverse direction due to a stretching force received by the composite material in a longitudinal direction.

8. The composite material of claim 1, wherein the elongate slits are arranged in a first diagonal direction.

9. The composite material of claim 8, wherein the elongate slits are configured to open in a second diagonal direction perpendicular to the first diagonal direction due to a stretching force received by the composite material in the second diagonal direction.

10. The composite material of claim 1, wherein the elongate slits are arranged in two or more of a longitudinal direction, a transverse direction or a diagonal direction and are configured to open in an opposite direction to each direction in which the plurality of elongate slits are arranged in response to a stretch force applied in the opposite direction.

11. The composite material of claim 10, wherein the first material and the second material have a different at least one of water resistance, wind resistance, or air permeability.

12. The composite material of claim 1, wherein the first textile layer comprises a first material and the second textile layer comprises a second material different than the first material.

13. The composite material of claim 1, wherein at least one of the first textile layer or the second textile layer is configured to increase the expansion of the plurality of elongate slits in response to the stretch force.

14. The composite material of claim 1, wherein at least one of the first textile layer or the second textile layer is configured to restrict the expansion of the plurality of elongate slits in response to the stretch force.

15. The composite material of claim 1, wherein the slit layer is a waterproof breathable laminate or membrane.

16. A composite material comprising:

a first textile layer;

a second textile layer; and a slit layer coupled to the first textile layer and the second textile layer, wherein the slit layer comprises material having a plurality of elongate slits formed therein, and the plurality of elongate slits being arranged such that, when the material is stretched in a direction transverse to a longitudinal direction of the plurality of elongate slits, the plurality of elongate slits open, thereby transitioning the material from a first state to a second state;

wherein in the first state, the material is in a relaxed condition in which the plurality of elongate slits are closed, and the material has a first air permeability of less than about 10 cubic feet per minute (CFM); and wherein in the second state, the material is in a stretched condition in which the plurality of elongate slits are at least partially open, and the material has a second air permeability of greater than about 10 CFM.

* * * * *